Patented June 17, 1952

2,600,765

UNITED STATES PATENT OFFICE 2,600,765

METHOD OF PREPARING A COMMINUTED MEAT PRODUCT

Walter E. Hauch, Forest Park, Ill., assignor to Swift & Company, Chicago, Ill., a corporation of Illinois No Drawing. Application April 8, 1949, Serial No. 86,409

1 Claim. (Cl. 99—108)

This invention relates to a novel food product and to a novel method for making the same. More specifically the invention relates to a comminuted meat product, such as frankfurters or the like, having uniformly distributed therein a specially treated pickle relish, and to a method for making such meat product.

When frankfurters or similar comminuted meat products are served to the ultimate consumer, it is customary to serve mustard, relish, or some other seasoning with them. It has been customary in the past to serve such seasoning as a spread on the outside of the frankfurter or the like. This method of applying the seasoning to the comminuted meat product results in a rather unattractive appearance of the product as well as in the undesirable possibility of the seasoning spilling from the product to the hands or clothing of the consumer.

It therefore is an object of this invention to provide a meat product comprised substantially of comminuted meat and having uniformly incorporated therein a chopped pickle relish.

It is another object of this invention to provide a method of treating the pickle relish before incorporation thereof with the comminuted meat so that the meat will adhere to the particles of the relish.

Another object of this invention is to provide a food product containing comminuted meat and a chopped pickle relish which will not develop a "short" condition upon standing.

A further object of this invention is to provide a method of treating pickle relish prior to incorporation thereof with a comminuted meat product so that the said pickle relish will not cause a breaking down of the tissues of the meat upon such incorporation therewith.

Additional objects, if not hereinafter specifically set forth, will be apparent to one skilled in the art from the following detailed description of the invention.

Essentially, the invention resides in the incorporation of pickle relish with comminuted meat to form a product having particles of relish uniformly distributed therethrough.

The pickle relish referred to is similar to the type commonly served with frankfurters and like products as an added seasoning to be spread thereon. A method has long been sought to incorporate such relish with the comminuted meat product prior to sale to the consumer, but until the present invention little had been accomplished. It would appear to be an obvious expedient to merely mix the chopped relish and comminuted meat together. However, such a procedure results in a product which is very unsatisfactory. The conventional pickle relish is comprised essentially of chopped sweet pickles, vinegar, and water. When incorporated directly with a comminuted meat product, the vinegar liquor and moisture combine to break down the tissues of the meat, causing what is known in the art as a "short" condition. When this "short" condition results, the meat will not adhere to the individual particles of relish and the desired uniformity of the product is destroyed.

It has been discovered that if the chopped pickle relish is partially dehydrated prior to incorporation thereof with the comminuted meat, this "short" condition is avoided and the resulting product is uniform and of pleasing appearance and taste.

The method of treating the pickle comprises washing the chopped pickle relish to remove the excess vinegar liquid and then dehydrating the remaining relish to between 25 and 50 per cent of its original weight.

Pickle relish, treated in the foregoing manner, when added to comminuted meat will not cause any breaking down of the meat tissues. The treated, partially dehydrated relish may be mixed with the comminuted meat in any desired proportions, using conventional mixing means. It has been found that about five to ten pounds of chopped treated relish to one hundred pounds of comminuted meat results in a product desirable to the average consumer. The resulting product may be molded to any desired form; and in the case of frankfurters, it may be stuffed into the desired size casings, linked in desired lengths, and then smoked and cooked in the usual manner.

Obviously, many modifications and variations of the invention as hereinbefore set forth may be made without departing from the spirit and scope thereof, and therefore only such limitations should be imposed as are indicated in the appended claim.

I claim:

A method of making a comminuted meat product having uniformly distributed particles of pickle relish therein which will not develop a short condition upon standing, comprising washing conventional chopped pickle relish in water to remove a portion of the vinegar therefrom, partially dehydrating the washed relish to between 25 and 50 per cent of its original weight, and thereafter mixing the partially dehydrated relish with comminuted meat to uniformly distribute the particles of relish therein.

WALTER E. HAUCH.

REFERENCES CITED

The following references are of record in the file of this patent:

UNITED STATES PATENTS

| Number | Name | Date |
|---|---|---|
| 1,590,306 | Magers | June 29, 1926 |
| 1,964,011 | Vogt | June 26, 1934 |

FOREIGN PATENTS

| Number | Country | Date |
|---|---|---|
| 442,645 | Great Britain | Feb. 12, 1936 |
| 496,867 | Great Britain | Dec. 7, 1938 |

OTHER REFERENCES

"Everybody's Cook Book," 1937, by I. E. Lord, published by Harcourt, Brace, and Company, New York, pages 459, 460, and 461.